G. V. HANLON.
FLY KILLER.
APPLICATION FILED JAN. 16, 1915.
1,179,303.
Patented Apr. 11, 1916.
2 SHEETS—SHEET 1.
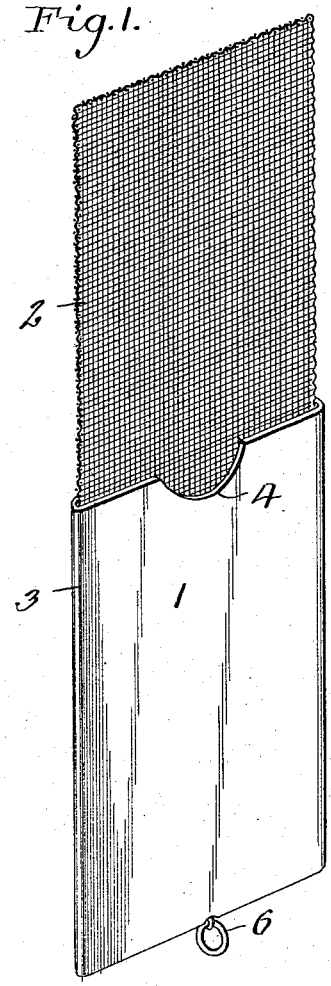
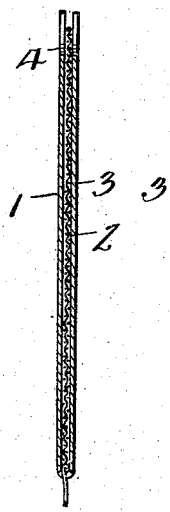
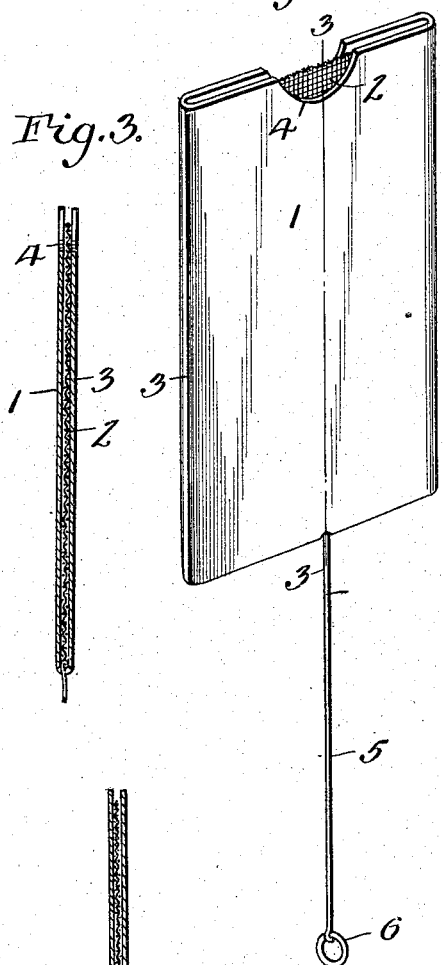
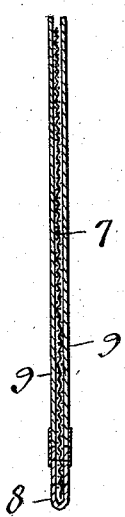
Witnesses
Inventor
G. V. Hanlon,
By Victor J. Evans
Attorney
THE COLUMBIA PLANOGRAPH CO., WASHINGTON, D. C.

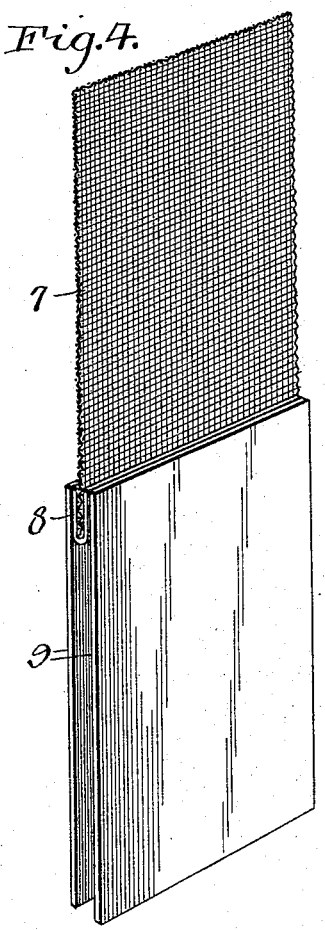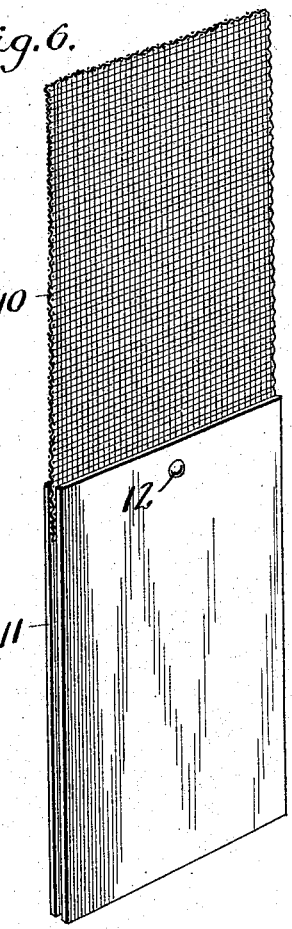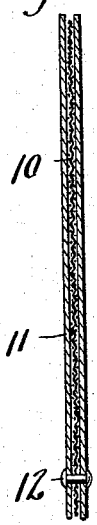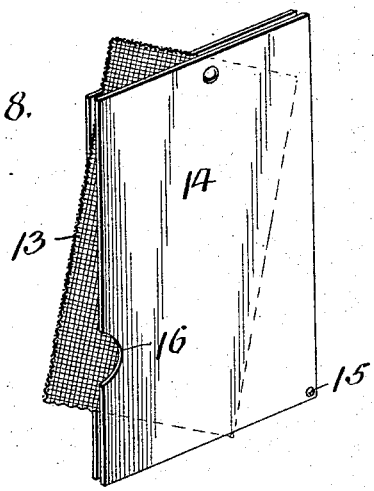

UNITED STATES PATENT OFFICE.

GEORGE V. HANLON, OF MOUNTAINAIR, NEW MEXICO.

FLY-KILLER.

1,179,303. Specification of Letters Patent. Patented Apr. 11, 1916.

Application filed January 16, 1915. Serial No. 2,731.

*To all whom it may concern:*

Be it known that I, GEORGE V. HANLON, a citizen of the United States, residing at Mountainair, in the county of Torrance and State of New Mexico, have invented new and useful Improvements in Fly-Killers, of which the following is a specification.

The present invention relates to improvements in fly killers.

In carrying out my invention it is my purpose to provide a fly killer which shall include a striker member and a handle member, the same being so associated or connected as to permit of the striker member being wholly concealed within and protected by the handle member when the device is in its inoperative position, and whereby the handle member serves as an effective reinforcement for the striker member when the device is in its operative position.

With the above and other objects in view, the improvement resides in the construction, combination and arrangement of parts set forth in the following specification and falling within the scope of the appended claim.

In the drawings: Figure 1 is a perspective view of one form of the improvement, the device being shown in its operative position, Fig. 2 is a similar view, the striker member being inclosed in and protected by the handle, Fig. 3 is a longitudinal sectional view approximately on the line 3—3 of Fig. 2, Fig. 4 is a perspective view of the modified form showing the device in its operative position, Fig. 5 is a central longitudinal sectional view of the same, the striker member being arranged within the handle member, Fig. 6 is a perspective view of a still further modified form, Fig. 7 is a central longitudinal sectional view through the same, with the striker member arranged within the handle, and Fig. 8 is a perspective view of a still further modified form, the striker member being partially rotated from the handle.

In the accompanying drawings and referring particularly to Figs. 1 to 3 thereof, the numeral 1 designates my improved fly killer in its entirety. The device includes a striker member 2 preferably constructed of woven wire and a handle 3. The handle, in the present instance, is in the nature of a substantially rectangular casing and the said casing is preferably constructed of some stout cardboard. The casing is in the form of an envelop having one of its ends open and the side members at the open end of the casing are provided with curved depressions or cut-away portions 4. The striker member is arranged for longitudinal movement within the casing and has its inner end provided with a flexible member 5 which projects through a central opening *a* in the closed end of the casing providing the handle 3. The outer end of the flexible member is formed with a ring or enlargement 6 which, when the striker member is drawn longitudinally from the handle contacts with the closed end of the said handle and limits the outward movement of the striker member. The ring also provides a means whereby the striker member may be drawn in the handle when the device is in its inoperative position, while the cut-away portions 4 provide means whereby the end of the striker member 2 may be grasped when the same is partially withdrawn from the handle and the device is in its set up or operative position.

In Figs. 4 and 5 I have illustrated a striker member 7 composed of a substantially rectangular strip of woven wire or other resilient material, one of the ends of the said striker being secured between the sides of a centrally bent strip 8 which forms the end member for the handle. The handle comprises a pair of substantially rectangular members 9—9 that are hingedly secured to the ends of the strip 8. In this structure the members 9—9 are folded over the striker member 7 when the device is not in use, and when the device is in use, the said members are folded in an opposite direction over the sides and strip 8 and have their outer faces contacting.

In Figs. 6 and 7 the striker member 10 is of a construction substantially similar to that previously described, and the handle member 11 comprises a pair of similarly shaped rectangular strips preferably of cardboard of a size sufficient to inclose the striker member 10 when the said striker is folded between the handle members. A pivot 12 passes centrally through the handle members adjacent one end thereof, and also through one end of the striker member 10, so that the said striker is pivotally secured between the handle, and when the device is brought to operative position, the handle members are swung to provide a continuation of the striker, the portion of the striker to the opposite sides of the pivot 12 being amply sufficient to prevent the breaking of the flexible or resilient striker when the device is manipulated.

In Fig. 8 the device is substantially similar to the structure disclosed in Figs. 6 and 7, the striker member 13 being pivoted between two rectangular members providing the handle 14, but the members forming the said handle 14 are secured together adjacent one of their corners opposite the ends between which the striker member is secured, the connection between the members providing the handle being indicated by the numeral 15, and the opposite or free ends of the said members are provided with arcuate cut-away portions 16 which provide means whereby the thumb and forefinger of an operator may grasp the opposite sides of the striker member 13 and rotate the same upon its pivot to bring the striker into operative position.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a fly killer, a flat substantially rectangular striker member of woven resilient material, a handle for the striker including two spaced members of a size to receive the striker when the striker is moved therebetween, and means for preventing the entire withdrawal of the striker from the handle.

In testimony whereof I affix my signature in presence of two witnesses.

GEORGE V. HANLON.

Witnesses:
HELEN CERMAR,
J. A. BEAL.